United States Patent Office 3,455,939
Patented July 15, 1969

3,455,939
4-(4-CHLORO-3-SULFAMOYLPHENYL)-1,4-DIHYDROPYRIDINES
Bernard Loev, Broomall, and James W. Wilson, Wayne, Pa., assignors to Smith Kline & French Laboratories, Philadelphia, Pa., a corporation of Pennsylvania
No Drawing. Filed June 7, 1967, Ser. No. 644,050
Int. Cl. C07d *31/48, 31/50;* A61k *27/00*
U.S. Cl. 260—294.8     3 Claims

ABSTRACT OF THE DISCLOSURE

The compounds are 1,4-dihydropyridines having a 4-chloro-3-sulfamoylphenyl group in the 4-position which are prepared by reacting a chloro-formylbenzenesulfonamide with two equivalents of a keto compound and ammonia, with two equivalents of an unsaturated amino compound or with one equivalent of a keto compound and one equivalent of an unsaturated amino compound. The compounds have hypotensive activity.

This invention relates to new 4-(4-chloro-3-sulfamoylphenyl)-1,4-dihydropyridines having pharmacodynamic activity, in particular having hypotensive activity. For example, hypotensive activity is demonstrated on oral administration to neurogenic hypertensive dogs at doses of 10 to 40 mg./kg.

The new compounds of this invention are represented by the following formula:

Formula I

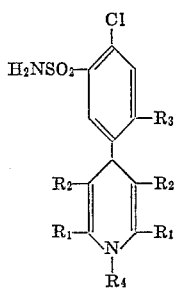

in which:

$R_1$ is lower alkyl having 1–6 carbon atoms;
$R_2$ is COOR' or COR'';
$R_3$ is hydrogen, halogen, lower alkyl, lower alkoxy or trifluoromethyl, said lower alkyl and lower alkoxy groups each having 1–4 carbon atoms;
$R_4$ is hydrogen or lower alkyl having 1–6 carbon atoms and
R' and R'' are lower alkyl having 1–6 carbon atoms.

Preferred compounds of this invention are represented by Formula I when $R_1$ is methyl; $R_2$ is carbomethoxy or carbethoxy; $R_3$ is hydrogen or chloro and $R_4$ is hydrogen.

The compounds of Formula I in which $R_4$ is hydrogen are prepared by the following procedures:

I

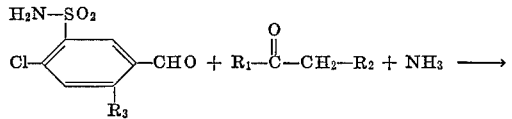

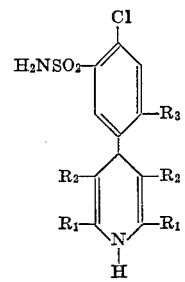

II

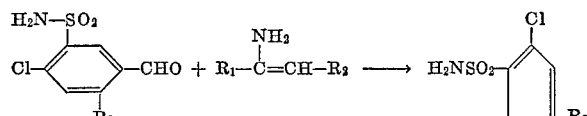

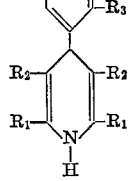

The terms $R_1$, $R_2$ and $R_3$ are as defined above.

According to procedure I, one molar equivalent of the chloro-formylbenzenesulfonamide is reacted with two molar equivalents of the keto compound and an excess of ammonia. The reaction is preferably carried out in a solvent, such as a lower alkanol or dioxane, at elevated temperature, conveniently at reflux temperature for about 1 to 14 hours.

According to procedure II, one molar equivalent of the chloro-formylbenzenesulfonamide is reacted with two molar equivalents of the unsaturated amino compound. Preferably, the reaction is carried out in a solvent, such as a lower alkanol or dioxane, at elevated temperature, conveniently at reflux temperature.

Also, compounds of Formula I in which $R_4$ is hydrogen are prepared by reacting one molar equivalent of the chloro-formylbenzenesulfonamide with one molar equivalent of the keto compound used in procedure I and one molar equivalent of the unsaturated amino compound used in procedure II.

Compounds of Formula I in which $R_4$ is lower alkyl are prepared from the corresponding compounds in which $R_4$ is hydrogen by oxidizing with an oxidizing agent such as a nitrous oxide, nitrous acid, hydroxylamine, hydrogen peroxide, oxygen, etc., then quaternizing using any suitable alkyl ester such as methyl iodide, ethyl sulfate, butyl methane sulfonate and the like and then reducing the resulting quaternary salt by using a chemical reducing agent such as sulfur dioxide or sodium hydrosulfite to give principally the 1,4-dihydropyridine or sodium borohydride to give principally the 1,2-dihydropyridine.

The chloro-formylbenzenesulfonamide starting materials are prepared from the corresponding chloro-sulfamoylbenzoic acids by esterifying to give the lower alkyl benzoate, then reducing the carboxylate group to hydroxymethyl with a reducing agent such as lithium borohydride and then oxidizing, for example with dimethylsulfoxide and acetic anhydride. The chloro-sulfamoylbenzoic acids are either known to the art or are prepared by chlorosulfonating a 4-chlorobenzoic acid and treating the resulting 4-chloro-3-chlorosulfonylbenzoic acid with ammonia. The 4-chloro-2-lower alkylbenzoic acids are prepared from 2-lower alkylanilines by diazotizing, then treating with cuprous chloride to give the 1-chloro-3-lower alkylbenzene, then nitrating to give the 1-chloro-3-lower alkyl-4-nitrobenzene and hydrogenating to give 4-chloro-2-ethylaniline which is diazotized, treated with cyanide and hydrolyzed. The 4-chloro-2-lower alkoxybenzoic acids are prepared by alkylating the corresponding 2-hydroxy compound. The 4-chloro-2-trifluoromethylbenzoic acid is prepared from 4-chloro-2-trifluoromethylaniline by diazotizing, treating with cyanide and hydrolyzing.

Although the dihydropyridines of this invention are drawn as having the 1,4-dihydro structure, the positions of the double bonds are not known with certainty in all instances and thus it is understood that some of these compounds may have the following 1,2-dihydropyridine structures:

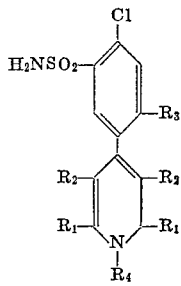

The terms $R_1$, $R_2$, $R_3$ and $R_4$ are as defined above.

The compounds of this invention may be administered internally in conventional dosage forms, such as tablets, capsules, injectables and the like, by incorporating an appropriate dose of the compound with pharmaceutical carriers according to accepted pharmaceutical practices.

The following examples are not limiting but are illustrative of this invention.

EXAMPLE 1

Anhydrous hydrogen chloride is bubbled through a solution of 74.0 g. of 2,4-dichloro-5-sulfamoylbenzoic acid in 1.5 l. of ethanol for two hours with stirring and occasional cooling in an ice bath. The solution is refluxed for two hours and then concentrated to dryness in vacuo. The residue is filtered, washed with cold water and dried to give ethyl 2,4-dichloro-5-sulfamoylbenzoate.

To 73.0 g. of ethyl 2,4-dichloro-5-sulfamoyl-benzoate in 300 ml. of dry tetrahydrofuran is added dropwise, with stirring, 19.6 g. of lithium borohydride in 150 ml. of dry tetrahydrofuran. The mixture is refluxed for five hours with stirring, then allowed to stand at room temperature for about 61 hours. Water is added slowly with stirring to the mixture, a total of 300 ml. of water being added. The mixture is filtered and the filtrate concentrated in vacuo, then chilled and filtered. The solid material is dissolved in 500 ml. of hot water and 100 ml. of isopropanol. The solution is treated with charcoal, filtered and acidified with concentrated hydrochloric acid to pH 2. The mixture is chilled and filtered to give 2,4-dichloro-5-hydroxymethylbenzenesulfonamide.

Acetic anhydride (260 ml.) is added to 33.0 g. of 2,4-dichloro-5-hydroxymethylbenzenesulfonamide in 390 ml. of dry dimethylsulfoxide. The mixture is allowed to stand at room temperature for 22 hours, then is poured into 300 ml. of ice water with stirring. Filtering, then stirring and refluxing the solid material with 200 ml. of 3 N hydrochloric acid for five minutes, then cooling and filtering gives 2,4-dichloro-5-formylbenzenesulfonamide.

To 6 g. of 2,4-dichloro-5-formylbenzenesulfonamide in 50 ml. ethanol is added 6.2 g. of ethyl acetoacetate and then 2.1 ml. of concentrated aqueous ammonium hydroxide solution. The resulting mixture is heated at reflux for three hours, then chilled. The solid material is filtered off and recrystallized from dimethylformamide-water to give 3,5-dicarbethoxy-4-(2,4-dichloro-5-sulfamoylphenyl)-1,4-dihydro-2,6-dimethylpyridine.

EXAMPLE 2

Six grams of ethyl acetoacetate and then 2.1 g. of ammonium hydroxide are added to 5 g. of 2-chloro-5-formyl benzenesulfonamide (prepared from 4-chloro-3-sulfamoylbenzoic acid by the procedure of Example 1) in 60 ml. of ethanol. The mixture is heated at reflux for 4.5 hours, then poured onto ice. The solid material is filtered off and recrystallized from acetonitrile to give 3,5-dicarbethoxy-4-(4-chloro-3-sulfamoylphenyl)-1,4-dihydro-2,6-dimethylpyridine.

EXAMPLE 3

Twenty grams of sodium nitrite is added portionwise with stirring to a mixture of 23.9 g. of 3,5-dicarbethoxy-4-(2,4-dichloro-5-sulfamoylphenyl)-1,4-dihydro-2,6-dimethyl-pyridine and 125 ml. of acetic acid. The resulting mixture is heated until the evolution of nitrogen oxide fumes ceases, then is poured into 1.5 l. of water. The oil which separates is extracted with ether. The extract is rinsed with dilute base and then with water, then dried and concentrated to give 3,5-dicarbethoxy-4-(2,4-dichloro-5-sulfamoylphenyl)-2,6-dimethylpyridine.

A mixture of 12.0 g. of the above prepared pyridine and 7.6 g. of dimethyl sulfate is heated on a steam bath for 15 hours. The mixture is cooled, stirred with ether and filtered to give the corresponding N-methyl pyridinium sulfate.

Five grams of the above prepared quaternary salt in a concentrated aqueous solution is added to a solution of 12 g. of sodium hydrosulfite and 15 g. of sodium carbonate in 100 ml. of water. The mixture is stirred under nitrogen for two hours. The mixture is extracted with ether, washed with water, dried and concentrated. The residue is recrystallized from methanol to give 3,5-dicarbethoxy-4-(2,4-dichloro-5-sulfamoylphenyl)-1,4-dihydro-1,2,6-trimethylpyridine.

Dissolving 5 g. of the N-methylpyridinium sulfate, prepared as described above, in 50 ml. of 40% ethanol, adding 5 g. of sodium carbonate and 1 g. of sodium borohydride gives a mixture containing 3,5-dicarbethoxy-4-(2,4-dichloro-5-sulfamoylphenyl)-1,4 - dihydro-1,2,6-trimethylpyridine and, principally, the corresponding 1,2-dihydro compound.

Similarly, using in place of dimethyl sulfate, 6.5 g. of ethyl bromide, 7.4 g. of n-propyl bromide or 8.2 g. of n-butyl bromide in the above procedure using sodium hydro-sulfite to reduce the quaternary salt the following products, respectively, are obtained:

3,5-dicarbethoxy-4-(2,4-dichloro-5 - sulfamoylphenyl)-1-ethyl-1,4-dihydro-2,6-dimethylpyridine, 3,5-dicarbethoxy-4-(2,4-dichloro-5 - sulfamoylphenyl)-1,4-dihydro-2,6-dimethyl-1-(n-propyl)pyridine and 1-(n-butyl)-4-(2,4-dichloro - 5 - sulfamoylphenyl)-3,5-dicarbethoxy-1,4-dihydro-2,6-dimethylpyridine.

EXAMPLE 4

Methyl acetoacetate (23.2 g.) and 17 ml. of concentrated aqueous ammonium hydroxide solution are added to 25.3 g. of 2,4-dichloro-5-formylbenzenesulfonamide in 200 ml. of ethanol. The resulting mixture is heated at reflux for four hours, then cooled, filtered and recrystallized from dimethylformamide-water to give 3,5-dicarbomethoxy-4-(2,4-dichloro - 5 - sulfamoylphenyl)-1,4-dihydro-2,6-dimethylpyridine.

Similarly, using 31.6 g. of t-butyl acetoacetate, the product is 3,5-dicarbo-t-butoxy-4-(2,4-dichloro-5-sulfamoylphenyl)-1,4-dihydro-2,6-dimethylpyridine.

EXAMPLE 5

Using 21.9 g. of 2-chloro-5-formylbenzenesulfonamide and 28.8 g. of ethyl 3-oxovalerate in the procedure of Example 2, the product is 3,5-dicarbethoxy-4-(4-chloro-3-sulfamoylphenyl)-2,6-diethyl-1,4-dihydropyridine.

Similarly, using 31.6 g. of methyl 3-oxoheptanoate, the product is 2,6-di-n-butyl-3,5-dicarbomethoxy-4-(4-chloro-3-sulfamoyl)-1,4-dihydropyridine.

EXAMPLE 6

To 25.3 g. of 2,4 - dichloro - 5-formylbenzenesulfonamide in 200 ml. of ethanol is added 20.4 g. of 2,4-pentanedione and 12 ml. of concentrated aqueous ammonium hydroxide solution. The mixture is heated at reflux for three hours, then cooled and filtered. The solid material is recrystallized from ethanol-water to give 3,5-diacetyl-4 - (2,4-dichloro - 5-sulfamoylphenyl)-1,4-dihydro-2,6-dimethylpyridine.

In the same manner using 2,4-octanedione in the above procedure, the product is a mixture of 4-(2,4-dichloro-5-sulfamoylphenyl) - 1,4-dihydro-2,6 - dimethyl-3,5-divalerylpyridine and 3,5 - diacetyl - 2,6-dibutyl-4-(2,4-dichlorosulfamoylphenyl)-1,4-dihydropyridine.

EXAMPLE 7

By the procedure of Example 1 using 70 g. of 4-chloro-2-methyl-5-sulfamoylbenzoic acid, the ethyl benzoate is prepared and it is reduced to give the hydroxymethyl compound which is then oxidized to give 2-chloro-5-formyl-4-methylbenzenesulfamide.

The above prepared benzenesulfonamide in ethanol is treated with ethyl acetoacetate and then concentrated aqueous ammonium hydroxide solution and the resulting mixture is refluxed for three hours, then worked up as in Example 1 to give 3,5 - dicarbethoxy-4-(4-chloro-2-methyl - 5-sulfamoylphenyl) - 1,4-dihydro-2,6-dimethylpyridine.

EXAMPLE 8

To 50 ml. of chlorosulfonic acid is added 23 g. of 4-chloro-2-methoxybenzoic acid portionwise with stirring and cooling keeping the temperature below 20° C. The resulting mixture is heated at about 120° C. for six hours, then cooled and poured onto ice. The mixture is extracted with chloroform. The extract is washed with ice-water, then dried, concentrated and filtered to give 4-chloro-5-chlorosulfonyl-2-methoxybenzoic acid.

Ten grams of the above prepared chlorosulfamoylbenzoic acid is added portionwise with stirring to 100 ml. of liquid ammonia. After the addition is complete, the excess ammonia is evaporated in vacuo. The residue is dissolved in water, treated with an excess of hydrochloric acid and filtered to give 4-chloro-2-methoxy-5-sulfamoylbenzoic acid.

By the procedure of Example 1 using 4-chloro-2-methoxy - 5 - sulfamoylbenzoic acid in place of 2,4-dichloro-5-sulfamoylbenzoic acid, the product is 3,5-dicarbethoxy-4 - (4 - chloro - 2-methoxy - 5-sulfamoylphenyl) - 1,4-dihydro - 2,6-dimethylpyridine.

EXAMPLE 9

2-amino - 5 - chlorobenzotrifluoride (22.4 g.) is dissolved in 400 ml. of aqueous solution containing 35 g. of concentrated sulfuric acid. The solution is cooled to 10° C., 6.9 g. of sodium nitrite in 40 ml. of water is added and the mixture is stirred for 30 minutes. The resulting diazonium salt is filtered off, then suspended in water and the aqueous suspension is added to a solution of 6.5 g. of cuprous cyanide and 13 g. of potassium cyanide in 25 ml. of water. The resulting solution is heated for 30 minutes at 70–80° C., then cooled and the precipitate is filtered off, then suspended in 50 ml. of 10% aqueous sodium hydroxide solution. The suspension is heated at reflux for two hours, then cooled and acidified with hydrochloric acid and filtered to give 4-chloro-2-trifluoromethylbenzoic acid.

By the procedure of Example 8, the above prepared benzoic acid is 5-chlorosulfonated and then treated with ammonia to give 4-chloro-5-sulfamoyl-2-trifluoromethylbenzoic acid.

Using 4-chloro-5-sulfamoyl - 2-trifluoromethylbenzoic acid in place of 2,4-dichloro-5-sulfamoylbenzoic acid in the procedure of Example 1, the product is 3,5-dicarbethoxy-4-(4-chloro - 5-sulfamoyl - 2-trifluoromethylphenyl) - 1,4-dihydro - 2,6-dimethylpyridine.

EXAMPLE 10 m-Ethylaniline (15 g.) is dissolved in 100 ml. of 3:1 hydrochloric acid-water. The solution is cooled to 15° C. and a solution of 1.2 moles of sodium nitrite in 20 ml. of water is added. After 10 minutes, the solution is poured into a solution of 25 g. of cuprous chloride in 100 ml. of concentrated hydrochloric acid at 60–70° C. The mixture is heated at 83° C. and then cooled, extracted with ethyl ether, rinsed with water, dried and distilled to give 1-chloro-3-ethylbenzene.

To 10 g. of 1-chloro-3-ethylbenzene is added, with cooling, 12 g. of concentrated nitric acid (d. 1.52). The resulting mixture is stirred for 24 hours. Water is added and the oil layer is isolated and distilled to give 1-chloro-3-ethyl-4-nitrobenzene. This nitro compound is dissolved in ethanol and hydrogenated using palladium-on-charcoal as catalyst at room temperature to give 4-chloro-2-ethylaniline.

By the procedure of Example 9, 4-chloro-2-ethylaniline is diazotized, treated with cuprous cyanide and hydrolyzed to give 4-chloro-2-ethylbenzoic acid. Chlorosulfonating, then treating with ammonia gives 4-chloro-2-ethyl-5-sulfamoylbenzoic acid.

According to the procedure of Example 1 using the above prepared 4-chloro - 2-ethyl - 5-sulfamoylbenzoic acid, the product is 3,5 - dicarbethoxy-4-(4-chloro - 2-ethyl - 5-sulfamoylphenyl) - 1,4-dihydro - 2,6-dimethylpyridine.

Similarly, using m-butylaniline, the product is 3,5-dicarbethoxy-4 - (2-butyl - 4-chloro - 5-sulfamoylphenyl)-1,4-dihydro-2,6-dimethylpyridine.

EXAMPLE 11

Five grams of 4-chlorosalicylic acid is dissolved in 200 ml. methanol. Gaseous hydrogen chloride is bubbled into the solution while heating at reflux for two hours. The excess methanol is distilled off and the residue is distilled in vacuo to give methyl 4-chlorosalicylate. To this salicylate in 200 ml. acetone, is added two equivalents of ethyl iodide and 10 g. of anhydrous potassium carbonate. The resulting suspension is heated for 18 hours, then filtered. The filtrate is concentrated, dissolved in ether and extracted with 5% aqueous sodium hydroxide solution. The organic layer is concentrated, dried and distilled in vacuo to give methyl 4-chloro-2-ethoxybenzoate.

The above prepared benzoate, suspended in 100 ml. of 10% aqueous sodium hydroxide solution, is heated for four hours. Cooling, acidifying with hydrochloric acid and filtering gives 4-chloro-2-ethoxybenzoic acid.

As described in Example 10, from the above prepared benzoic acid, 3,5 - dicarbethoxy - 4 - (4-chloro-2-ethoxy - 5 - sulfamoylphenyl) - 1,4 - dihydro - 2,6-dimethylpyridine is obtained.

By the same procedure using butyl bromide in place of ethyl iodide, the product is 3,5 - dicarbethoxy - 4-(2- butoxy-4-chloro-5-sulfamoylphenyl)-1,4-dihydro-2,6-dimethylpyridine.

What is claimed is:

1. A compound of the formula:

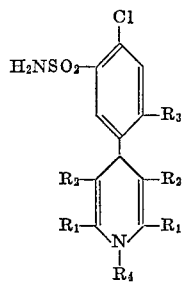

in which:
$R_1$ is lower alkyl having 1–6 carbon atoms;
$R_2$ is COOR' or COR'';
$R_3$ is hydrogen, halogen, lower alkyl, lower alkoxy or trifluoromethyl, said lower alkyl and lower alkoxy groups each having 1–4 carbon atoms;
$R_4$ is hydrogen or lower alkyl having 1–6 carbon atoms and
R' and R'' are lower alkyl having 1–6 carbon atoms.

2. A compound according to claim 1 in which $R_1$ is methyl, $R_2$ is $COOCH_2CH_3$, $R_3$ is chloro and $R_4$ is hydrogen.

3. A compound according to claim 1 in which $R_1$ is methyl, $R_2$ is $COOCH_2CH_3$ and $R_3$ and $R_4$ are hydrogen.

References Cited

UNITED STATES PATENTS 2,275,354  3/1942  Ewins et al. _____ 260—294.8
3,325,505  6/1967  Loev _____ 260—295.5

HENRY R. JILES, Primary Examiner

ALAN L. ROTMAN, Assistant Examiner

U.S. Cl. X.R.

260—470, 473, 482, 483, 556, 999